April 2, 1968 J. L. FISHER 3,376,086
HOUSING FOR ELECTRICAL APPARATUS
Filed Oct. 18, 1966
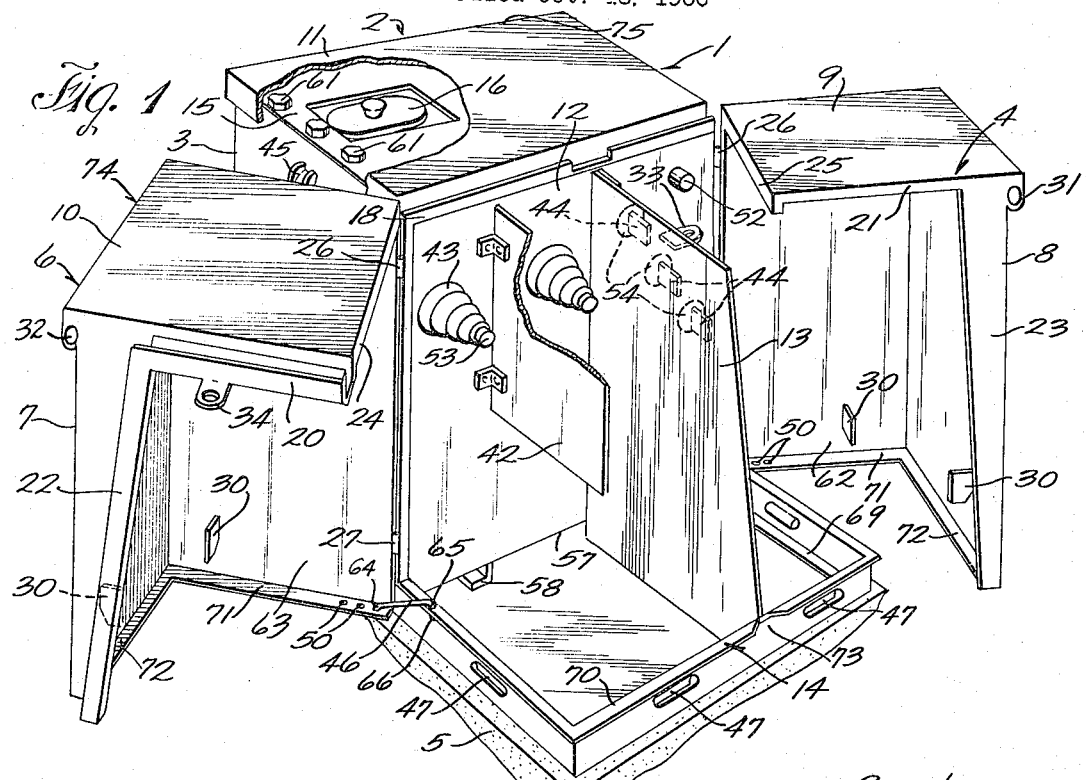
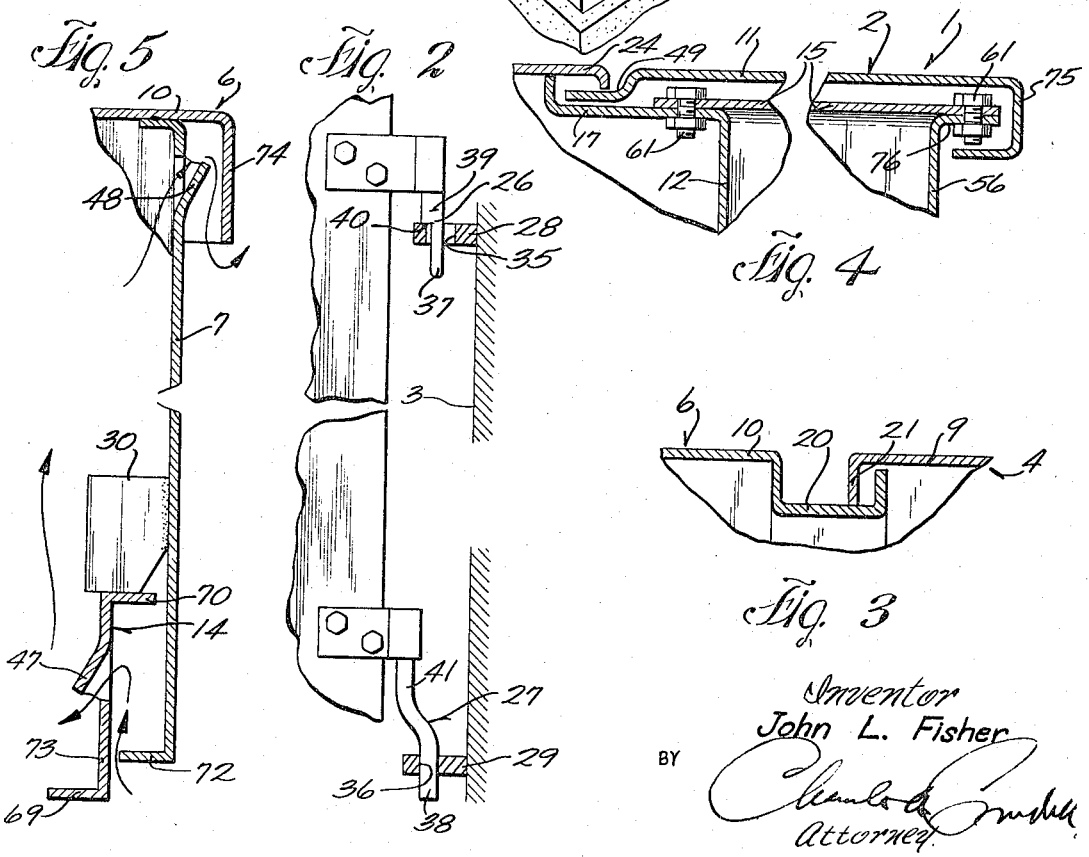
Inventor
John L. Fisher
BY
Attorney United States Patent Office 3,376,086
Patented Apr. 2, 1968

3,376,086
HOUSING FOR ELECTRICAL APPARATUS
John L. Fisher, South Zanesville, Ohio, assignor to McGraw-Edison Company, Milwaukee, Wis., a corporation of Delaware
Filed Oct. 18, 1966, Ser. No. 587,487
7 Claims. (Cl. 312—100)

ABSTRACT OF THE DISCLOSURE

A ground level electrical apparatus housing having two doors which when opened allow access to the housing from its top and three sides and which may be removed from the housing when opened. One door and an edge portion of the housing each have an outward facing U-shaped flange and the other door has a flange which overlaps the U-shaped flanges so that water on the surface of the housing can run into the U-shaped flange and be drained away by it.

---

This invention relates in general to a housing and more particularly to a housing for enclosing electrical apparatus at ground level.

Underground electrical distribution systems have become popular in areas where attractive appearance is desired because they eliminate aesthetically displeasing overhead lines, poles, etc. An underground distribution system reduces maintenance costs due to wind, ice and tree limb damage. The possibility of lightning damage is also considerably decreased. However, the electrical apparatus used in an underground distribution system must be made accessible to servicemen, and at the same time safe and tamperproof to the general public.

The present types of housings used to enclose ground level electrical apparatus generally limit access to the side areas only of the apparatus. Those housings that do provide ready access from more than one side or from the top of the housing do not satisfactorily prevent water from draining into the housing or require that a section of the housing be completely removed to gain access.

It is an object of this invention to provide a ground level mounted housing which will completely enclose the electrical apparatus and yet allow simultaneous access to the apparatus from three sides and the top of the housing.

Another object of this invention is to provide a housing for electrical apparatus allowing easy access to the apparatus from above but which will prevent water from draining or leaking into the interior of the housing.

Still another object is to provide a housing which is safe and tamperproof to the general public but which has a simple and adequate ventilation system for the electrical apparatus enclosed by the housing.

A further object is to provide a housing arranged to allow access to authorized personnel only to designated compartments therein in which electrical apparatus is located.

A specific object of this invention is to provide a housing for electrical apparatus allowing cooling of the electrical apparatus by direct exposure of the container of the electrical apparatus to air outside the housing.

The present invention accomplishes the above stated objects by providing a housing which may be mounted at ground level and which has a pair of doors formed from part of the top and sides of the housing. One door and an edge portion of the housing have U-shaped flanges and each of the doors have flanges which overlap or fit into the U-shaped flanges when the doors are closed to engage each other and the housing. The U-shaped flanges receive and drain away liquid on the surface of the housing and the flanges overlapping the U-shaped flanges facilitate this draining objective. When the flanges on the doors extend into the U-shaped flanges the draining of liquid on the surface of the housing into the U-shaped flanges is further facilitated and the resulting interlock of the flanges also holds the doors in engagement with each other. In addition, the overlapping flange arrangement prevents tampering by insertion of objects between the doors into the interior of the housing. The doors are mounted on hinges which allow them to be positioned in a lower interlocking posture when the doors are closed and to be moved to and held in a raised posture to clear the interlocking flange portions and be swung open.

Other objects and a fuller understanding of the invention may be had by referring to the following description and claims, taken in conjunction with the accompanying drawings in which:

FIG. 1 is a perspective view of the housing of this invention;

FIG. 2 is an enlarged partial view showing the hinges on which housing access doors are mounted;

FIG. 3 is a vertical section view, partially broken away, of the engaged door flanges;

FIG. 4 is a vertical section view, partially broken away, of the transformer casing cover assembly of FIG. 1;

FIG. 5 is a vertical section view, partially broken away, of a door taken through the louvered portions.

In the preferred embodiment of this invention, housing 1 is mounted on a concrete pad 5 to enclose the electrical apparatus. The electrical apparatus may be, for example, an electrical transformer (not shown) and its primary terminals 53 supported within primary bushings 43 and secondary terminals 44 supported within secondary bushings 54. Referring to FIGS. 1 and 3, the housing 1 of this invention includes a transformer casing 2 having a false cover 11 and a bolted cover 15 with a handhole cover 16, a door sill 14, a pair of movable doors 4 and 6 adapted to engage each other and resting on sill 14 when in a closed position. Lifting legs 45, one of which is not visible on the drawing, are provided for lifting the housing 1 into place on concrete pad 5.

The transformer casing 2 has a pair of side walls 3, one of which is not visible in the drawing, and side walls 56 (shown in FIG. 4) and 12 all rigidly attached to each other and to bottom 57 by means such as welding or brazing suitable to provide a sealed casing. The transformer casing 2 is given further rigidity and supported on the concrete pad 5 by angle irons 58, one of which is not visible in the drawing. Attaching bolted cover 15 to the top of the transformer casing 2 by means of bolts 61 provides a complete container for enclosing the electrical transformer (not shown) and its cooling oil (not shown).

The housing is provided with a door sill 14 rigidly attached to the transformer casing 2 and consisting of a Z-shaped angle member having a base portion 69 resting on concrete pad 5 and an outward facing flange upper member 70 supporting doors 4 and 6 when the doors 4 and 6 are in a closed position. The base portion 69 and the outward facing upper flange member of the door sill 14 are connected by the upright portion 73.

The door 4 includes side 62 and front side 8, both rigidly attached to top 9 by suitable means such as welding or brazing. The door 6 is similarly constructed from side 63, front side 7 and top 10. As shown in FIGS. 1 and 4, the side wall 12 of transformer casing 2 has an upward facing L-shaped flange 17 formed adjacent its upper edge. The doors 4 and 6 each have downward facing L-shaped flanges 24 and 25, respectively, formed along the rear edges of their tops 9 and 10 which fit into the L-shaped flange 17 when the doors 4 and 6 are closed. The door 6 has outward facing U-shaped flanges 20 and 22, respectively, formed along the edges of its top 10 and front side 7 in engagement with door 4 when the doors are closed. The door 4 has inward facing L-shaped flanges 21 and 23, respectively formed along the edges of its top 9 and front side 8 in engagement with door 6 and fitting into the U-shaped flanges 20 and 22 of door 6 when the doors are in a closed position. The doors 4 and 6 are supported when in their closed position on doorsill 14 by sill dogs 30 affixed to doors 4 and 6 by suitable means such as welding. When the doors 4 and 6 are in their closed position, the fitting of the inward facing L-shaped flanges 21, 23, 24 and 25 into the outward facing U-shaped flanges 17, 20 and 22 form gutters for draining of water off of housing 1. In this way the interior of housing 1 is kept dry and the operation of the electrical apparatus contained within the portion of the housing covered by doors 4 and 6 is not hindered or disrupted by drainage of water into the housing.

As shown in FIG. 2, two upper hinge ears 28 and two lower hinge ears 29 are respectively attached to side walls 3 of transformer casing 2. The hinge ears 28 are each provided with hinge pin holes 35 and the hinge ears 29 are each provided with hinge pin holes 36. The two upper hinge pins 26 and two lower hinge pins 27 are respectively mounted on doors 4 and 6, and respectively slidably and pivotally fit into hinge pin holes 35 and 36. The hinge pins 26 each have a lower end 37 and an upper end 39 with shoulders 40 formed intermediate ends 37 and 39. The hinge pins 27 each have an upper end 41 and a lower end 38 offset from upper end 41. When doors 4 and 6 are in a closed position, as shown in FIGS. 3 and 4, the various flanges of the doors 4 and 6 and the side wall 12 will be in an interfitting position. In this position the hinge pins 26 and 27, respectively, fit into hinge pin holes 35 and 36 adjacent the respective upper ends 39 and 41 of hinge pins 26 and 27. In order to move doors 4 and 6 to an open position, door 4 must be first lifted and pulled away from transformer casing 2. This movement will position the upper hinge pins 26 within hinge pin holes 35 at shoulder 40, as shown in FIG. 2. This movement will also position the lower end 38 of hinge 27 within hinge pin hole 36. The door 4 will now be in a raised position, with its L-shaped flanges 21, 23 and 25 clear of U-shaped flanges 20 and 22 and L-shaped flange 17. The door 4 may now be pivoted on hinge ears 28 and 29 to its open position as shown in FIG. 1. The foregoing procedure may now be repeated to move door 6 to its open position. To close doors 4 and 6, the opening procedure may be followed in a reverse sequence.

It should be noted that doors 4 and 6 may be completely removed from housing 1 when they are in their open position. This removal is accomplished by simply lifting the doors to slide their hinge pins 26 and 27 out of hinge pin holes 35 and 36. Removal of the doors 4 and 6 may be desirable when completely unrestricted access to the electrical apparatus adjacent the door sides 63 and 62 is desired.

As shown in FIG. 1, the door hold-open rods 46, one of which is not visible, are mounted on doorsill 14 and rest on doorsill 14 when not in use to hold doors 4 and 6 open. The ends 66 of door hold-open rods 46 are bent downward at a right angle with the remainder of the rod and inserted in holes 65 formed in doorsill 14. The ends 66 are swaged to hold the rods 46 in their position on the doorsill 14. The doors 4 and 6 are held in their open position by pivoting door hold-open rods 46 about their downward bent ends 66 and inserting ends 64 into the holes 50 provided adjacent the bottom edge of each door.

Means is provided for cooling the electrical apparatus enclosed by doors 4 and 6 and comprises louvers 47 formed in the upright portion 73 of doorsill 14 and louvers 48 formed adjacent the top edge of front sides 8 and 7, shown in FIG. 5. The louvers 47 open inwardly and downwardly and are located within the overlapping areas of L-shaped flanges 72 and 71 when doors 4 and 6 are in a closed position. The louvers 48 open outwardly and upwardly and are positioned within the overlapping areas of the downwardly facing L-shaped flanges 74 depending from the front edges of top sides 9 and 10. Any air within housing 1 heated by electrical apparatus therein will rise and escape from the housing 1 through louvers 48. Cool air, in turn, will enter the housing 1 near its bottom through louvers 47. In this manner, outside air will continually enter housing 1 to convectively cool electrical apparatus housed therein. The location of louvers 47 and 48 within the overlap of the respective L-shaped flanges 71, 72 and 74 and the direction of opening of the louvers 47 and 48 insures the housing 1 against tampering, while at the same time allowing cooling air to enter the housing 1.

As illustrated in FIG. 1, the portion of the housing 1 enclosed by doors 4 and 6 may be further divided into compartments. A partition wall 13 is here shown as being positioned at the point of engagement of doors 4 and 6 to form a compartment enclosed by door 6 and a compartment enclosed by door 4. The partition wall 13 is rigidly attached to and supported by casing wall 12 and doorsill 14.

Returning to the transformer casing 2 of housing 1, access to the interior of the transformer casing may be controlled by false cover 11. Referring to FIGS. 2 and 6, the false cover 11 has an inwardly facing U-shaped flange 75 fitting around the rear edge of bolted cover 15 and the outwardly facing L-shaped flange 76 formed along the upper edge of casing wall 56. Along the front edge of false cover 11 is formed an outwardly facing L-shaped flange 49 fitting against the upward facing L-shaped flange 17 of transformer casing wall 12. As can be seen in FIG. 4, the false cover 11 can be removed only by lifting the L-shaped flange 49 to clear the bolted cover 15 and bolts 61 and sliding the false cover 11 off transformer casing 2 in the direction of the rear edge of bolted cover 15. When the doors 4 and 6 are in a closed position, their L-shaped flanges 24 and 25 rest on false cover flange 49 and prevent it from being raised to remove false cover 11.

Access to the interior of housing 1 enclosed by doors 4 and 6 may be controlled by means of door locking eyes 31, 32, 33 and 34. The door locking eyes 31 and 32 are shown in FIG. 1 as being positioned respectively on doors 4 and 6 adjacent the L-shaped flanges 74 depending from top sides 9 and 10. When doors 4 and 6 are closed, the door locking eyes are placed in an aligned position. The doors 4 and 6 can then be secured by a padlock (not shown), or any other suitable locking means, to prevent unauthorized access to the interior of the housing 1 enclosed by doors 4 and 6. The locking of doors 4 and 6 in a closed position will also prevent unauthorized removal of false cover 11 and access to transformer casing 2, as previously described. Access to the compartment formed by partition 13 and enclosed by door 6 may be further controlled by means of door locking eyes 33 and 34 rigidly attached respectively to partition 13 and door 6. When the door 6 is in a closed position, door locking eyes 33 and 34 are in an aligned position. The door 6 may now be secured to partition 13 by suitable locking means such as a padlock (not shown). Although door 6 is thus locked in a closed position, door 4 may be opened by the releasing of the locking means from door locking eyes 32. By the use of different locking means to respectively secure locking eyes 31 and 32 and locking eyes 33 and 34, access to the compartment enclosed by door 4 may be allowed while access to the remainder of the housing 1 is prevented.

An example of the electrical apparatus which may be enclosed by housing 1 is shown in FIG. 1. The primary bushings 43 are mounted on and extend through the transformer casing wall 12 to support the primary terminals 53 of the transformer (not shown). The secondary bushings 54 are mounted on and extend through the transformer casing wall 12 to support the secondary terminals 44 of the transformer. An insulating phase barrier 42 is shown mounted on transformer casing wall 12 to separate and insulate the primary terminals 53 from each other. The grounding lug 52 is attached to transformer casing wall 12 to provide a terminal for electrically grounding the housing 1. The position of the grounding lug 52 is illustrative only and grounding means may be placed in any convenient location on the housing.

As has been shown and described, this invention provides for completely enclosing the electrical apparatus of an underground distribution system with a housing that is adapted to allow easy access to the electrical apparatus from three sides and the top of the housing. Further a housing is provided that allows easy access from the top of the housing and at the same time has means for preventing water from draining or leaking into the interior of the housing. Still further, a housing is provided that is safe and tamperproof to the general public, but which allows quick and easy access therein to authorized personnel only and has an adequate and efficient ventilation system to cool the housed electrical apparatus.

It should be noted that, although the housing has been discussed with regard to electrical distribution apparatus, it is readily adaptable to enclosing other apparatus, for example telephone equipment, or combinations of various apparatus, for example electrical distribution equipment and telephone equipment.

Although the invention has been described with relation to specific embodiments, it is not intended that it be limited thereto, and the appended claims are intended to cover all modifications of the invention which are within the true spirit and scope thereof.

What I claim is:

1. A housing for electrical apparatus including a plurality of wall portions and a pair of door portions, said door portions each having a top and two adjoining sides, said door portions being mounted for movement into and out of engagement with each other and with said wall portions, said door portions and wall portions having coacting means when engaged for receiving and draining liquid away from the surface of said housing, said coacting means including a U-shaped flange forming part of one of said door portions and a flange forming part of the other door portion and overlapping the U-shaped flange, whereby said flange directs liquid contacting the surface of said housing into the U-shaped flange.

2. The housing according to claim 1 wherein the flange overlapping the U-shaped flange also extends towards the U-shaped flange.

3. A housing for electrical apparatus comprising, in combination, a plurality of sides, first and second doors mounted on said sides, said doors each having an open and closed position, each of said doors engaging the other door and two of said plurality of sides of said housing when in a closed position, each of said doors and said two sides of said housing having coacting means for draining away liquid contacting said housing when said doors are in a closed position and holding said doors in a closed position, said coacting means including a U-shaped flange forming part of one of said doors and a flange forming part of the other door and extending into the U-shaped flange, whereby said flange and U-shaped flange are interlocked.

4. An electrical apparatus housing comprising, in combination, a plurality of sides, one of said sides being in an upward facing position, first and second doors arranged in juxtaposition and each having a top and two adjoining sides, said top of each of said doors consisting of a portion of the upward facing sides of said housing, said doors being mounted on said housing for movement into and out of engagement with each other and with said upward facing side, said upward facing side having a U-shaped flange and said doors each having a corresponding L-shaped flange, said first door having a pair of U-shaped flanges and said second door having a pair of corresponding L-shaped flanges, all of said U-shaped flanges being adapted to receive said corresponding L-shaped flanges when said doors engage each other and said upward facing side.

5. The housing according to claim 4 wherein said doors are mounted and supported on hinge means allowing both horizontal pivotal movement and vertical sliding movement of said doors, said hinge means supporting said doors in a lowered position when said doors are engaged, said hinge means pivotally supporting said doors in a raised position when said doors are disengaged.

6. A housing for electrical apparatus comprising, in combination, four sides and a top, said top and three of said sides having an access opening, said access opening having a plurality of edges defining its location, one of said edges being formed in said top with a U-shaped flange, first and second doors mounted on said housing and having an open and closed position, said doors each having a plurality of sides, said doors covering said access opening when in said closed position, said doors each having two corresponding edges in engagement with each other and each of said doors having an edge in engagement with the U-shaped flange of said top when said doors are in a closed position, said two corresponding edges of said first door each being formed with a U-shaped flange, said two corresponding edges of said second door each being formed with an L-shaped flange fitting into the U-shaped flanges of the corresponding edges of said first door when said doors are moved to an engaged closed position, said edge of each door in engagement with said U-shaped flange of said top being formed with an L-shaped flange fitting into said U-shaped flange of said top when said doors are moved to an engaged closed position.

7. The combination according to claim 6 wherein each of said doors is provided with an upper and lower hinge pin and said housing is provided with corresponding upper and lower hinge ears, said hinge ears each having an opening for slidably receiving and positioning said hinge pins whereby said doors are supported, said upper hinge pins each having an upper and lower end and a shoulder intermediate said ends, said lower hinge pins each having an upper end and a lower end offset from said upper end, said doors having a lowered position on said hinge ears and a raised position on said hinge ears in which said doors may be pivoted, said doors being supported in said lowered position on said hinge ears adjacent the upper ends of said upper and lower hinge pins, said doors being supported on said hinge ears in said raised position on the shoulders of said upper hinge pins and being guided during pivotal movement by the offset lower end of said lower hinge pins, said hinge pins being slidably removable from said hinge ears to thereby detach said doors from said housing when said doors are in said open position.

References Cited

UNITED STATES PATENTS

| 1,409,445 | 3/1922 | Hillyer et al. | 312—324 XR |
| 1,919,986 | 7/1933 | Powers | 312—100 |
| 3,014,158 | 12/1961 | Nelson et al. | 174—16 |

FOREIGN PATENTS

| 795,873 | 6/1958 | Great Britain. |

BOBBY R. GAY, *Primary Examiner.*

J. L. KOHNEN, *Assistant Examiner.*